(12) United States Patent
Le Roux

(10) Patent No.: US 6,264,217 B1
(45) Date of Patent: *Jul. 24, 2001

(54) TROLLEY AND A WHEEL ASSEMBLY FOR SUCH A TROLLEY

(75) Inventor: Pierre Andre Le Roux, Gordon's Bay (ZA)

(73) Assignee: Neil Liebenberg, Somerset West (ZA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/875,912
(22) PCT Filed: Feb. 6, 1996
(86) PCT No.: PCT/GB96/00244
  § 371 Date: Sep. 30, 1997
  § 102(e) Date: Sep. 30, 1997
(87) PCT Pub. No.: WO96/24518
  PCT Pub. Date: Aug. 15, 1996

(30) Foreign Application Priority Data

Feb. 6, 1995 (ZA) .................................................. 95/0927

(51) Int. Cl.⁷ .................................................. B62D 39/00
(52) U.S. Cl. ........................ 280/33.994; 188/5; 280/43.24
(58) Field of Search ........................ 280/33.994, 33.992, 280/33.991, 47.34, 43, 43.14, 43.24, 43.34; 188/5, 6, 7, 19, 1.12, 265, 23; 16/35 R, 35 D

(56) References Cited

U.S. PATENT DOCUMENTS

| | | | |
|---|---|---|---|
| 3,090,470 | * 5/1963 | Abrams | 280/33.994 |
| 3,186,728 | * 6/1965 | Turlington | 280/33.994 |
| 3,217,839 | * 11/1965 | Watkins et al. | 280/33.994 |
| 3,356,185 | 12/1967 | Isaacks | 188/31 |
| 3,366,201 | 1/1968 | Pesta | 188/110 |
| 3,892,295 | 7/1975 | Hahto | 188/111 |
| 4,199,043 | 4/1980 | Lankester et al. | 188/111 |
| 4,494,271 | * 1/1985 | Perlin et al. | 16/21 |
| 5,720,079 | * 2/1998 | Yang | 16/35 R |

* cited by examiner

Primary Examiner—Robert P. Olszewski
Assistant Examiner—Andrew J. Fischer
(74) Attorney, Agent, or Firm—Ladas & Parry

(57) ABSTRACT

A trolley has rear support wheels (20) each having a toggle (52) which, when in a cocked position, hold the wheels in an operative position in which they are able to support the trolley. When the trolley ceases to bear down on the rear wheels, for example when an attempt is made to lift the trolley over a barrier (26) along the periphery of a defined area from which the trolley is not supposed to be removed, the toggle is triggered to move to an un-cocked position. When the toggle is in the un-cocked position the support wheels collapse and are no longer able to support the trolley. This will discourage removal of the trolley from the defined area.

12 Claims, 3 Drawing Sheets

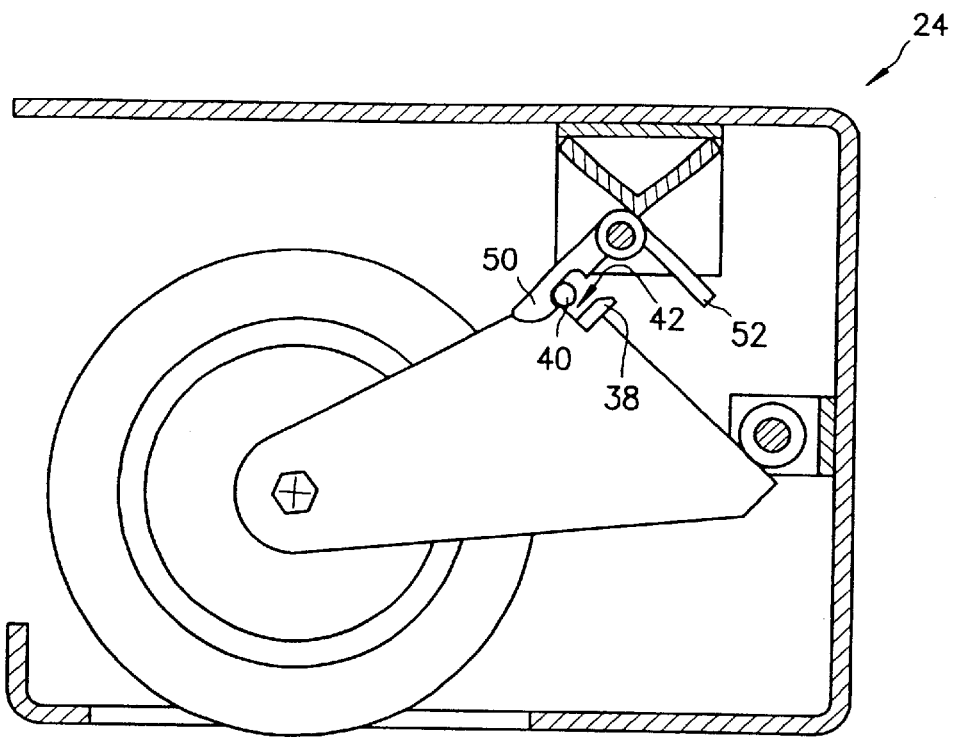
FIG 6
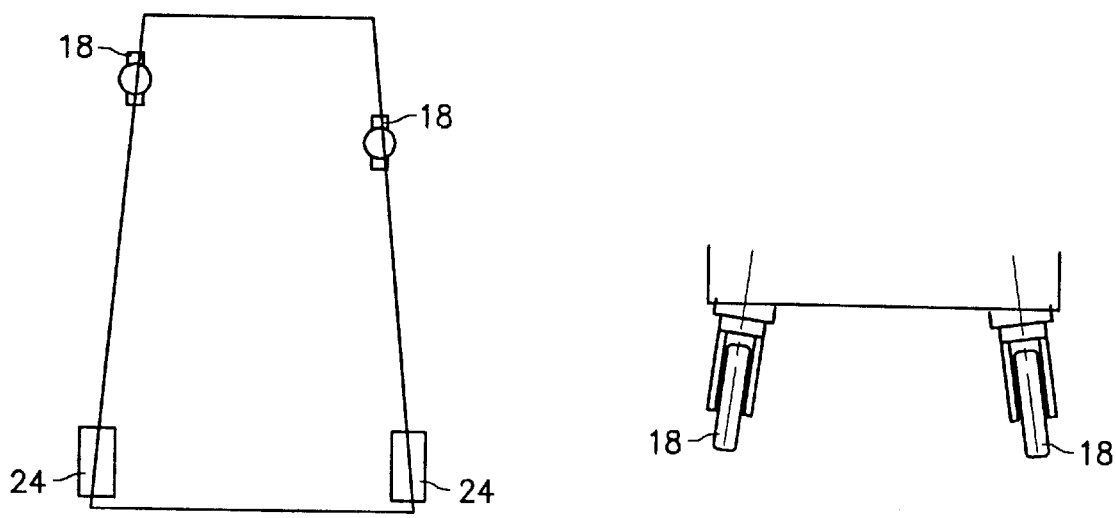
FIG 7
FIG 8

TROLLEY AND A WHEEL ASSEMBLY FOR SUCH A TROLLEY

This invention relates to a trolley and to a wheel assembly for such a trolley. More particularly, it relates to trolleys of the type that are used by customers in supermarkets or other self-service shops or by passengers at airports, which are provided with means for discouraging their removal from a defined area.

According to the invention there is provided a trolley having a support wheel on which in use the trolley bears down, the trolley comprising an immobilising mechanism for immobilising the trolley, the arrangement of the immobilising mechanism being such as to be triggered to come into effect when the trolley ceases to bear down on the support wheel.

The defined area may then have a barrier in the form of a low ridge along the periphery thereof, the barrier requiring the trolley to be lifted in order to move it over the barrier. When this is done the immobilising mechanism comes into effect, immobilising the trolley.

By an immobilising mechanism is meant a mechanism that is capable of impeding or otherwise interfering with the normal movement of the trolley on its support wheels.

The support wheel may have a collapsible wheel mounting, the immobilising mechanism comprising a displaceable member (herein also referred to as a toggle) which is displaceable between a cocked position in which it operates to keep the wheel mounting from collapsing, and an un-cocked position in which it allows the wheel mounting to collapse.

The toggle may be spring-loaded by means of a spring, the spring biasing the toggle to the un-cocked position.

The immobilising mechanism may further comprise a latch and a catch cooperating with the latch once the wheel mounting has moved to the collapsed condition, to keep the wheel mounting in the collapsed condition.

The support wheel may be mounted in a housing having an opening therein through which the support wheel protrudes when the wheel mounting is in the normal, trolley-supporting condition, the arrangement being such that the wheel is withdrawn into the housing when the wheel mounting collapses.

The collapsible wheel mounting may comprise a pivotally mounted wheel bracket.

Said support wheel may be a rear wheel of the trolley, the trolley having a laterally spaced pair of such rear wheels, and further a laterally spaced pair of front support wheels, the front support wheels being offset with respect to one another in the front-to-rear direction of the trolley.

Alternatively, or in addition, the front support wheels may be cambered.

The invention extends to a wheel assembly for a trolley, the wheel assembly comprising a support wheel, a support frame, and a wheel mounting via which the support wheel is mounted on the support frame, the wheel mounting being collapsible with respect to the support frame, the wheel assembly further comprising a toggle which is displaceable between a cocked position in which it operates to keep the wheel mounting from collapsing, and an un-cocked position in which it allows the wheel mounting to collapse.

The invention will now be described in more detail, by way of example, with reference to the accompanying drawings.

In the drawings:

FIG. 6 is a view similar to FIG. 5, but showing the parts of the assembly in the position they are in after the trolley has been lowered again on the other side of the barrier;

FIG. 7 is a schematic plan view of the trolley, showing one possible arrangement of the front wheels thereof; and FIG. 8 is a schematic front view of the trolley, showing another possible arrangement of the front wheels.

Figure 1:
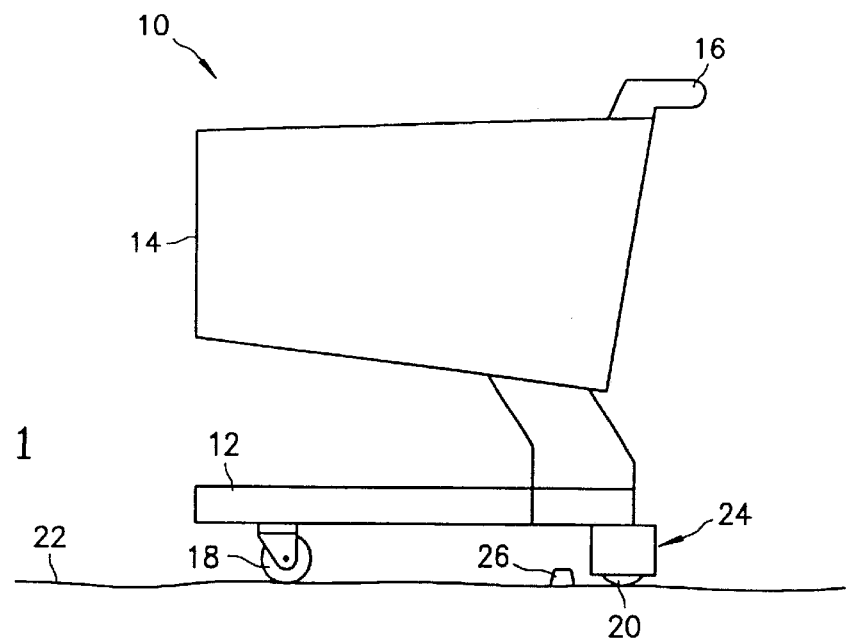
FIG. 1 is a diagrammatic side view of a trolley in accordance with the invention.

Referring first to FIG. 1, reference numeral 10 generally indicates a trolley which comprises a base 12, a basket 14 on the base, and a handle 16 at the rear end thereof. It further has front and rear support wheels 18 and 20 respectively, for supporting it on a surface 22. The front wheels 18 are castor wheels. As will be described in more detail hereinafter, each of the two rear wheels 20 forms part of an assembly 24 which includes an immobilizing mechanism, the purpose of which is to discourage removal of the trolley from a defined area, for example, the area around a shopping centre or airport. All along the periphery of this area there is a barrier 26 which consists of a low ridge projecting from the surface 22. In order to remove the trolley 10 from the defined area, the rear of the trolley has to be lifted over the barrier 26 and, as will be explained in more detail hereinafter, this brings the immobilising mechanism into effect. As a consequence, once the trolley has been moved over the barrier 26, further movement thereof is impeded.

Figure 2:
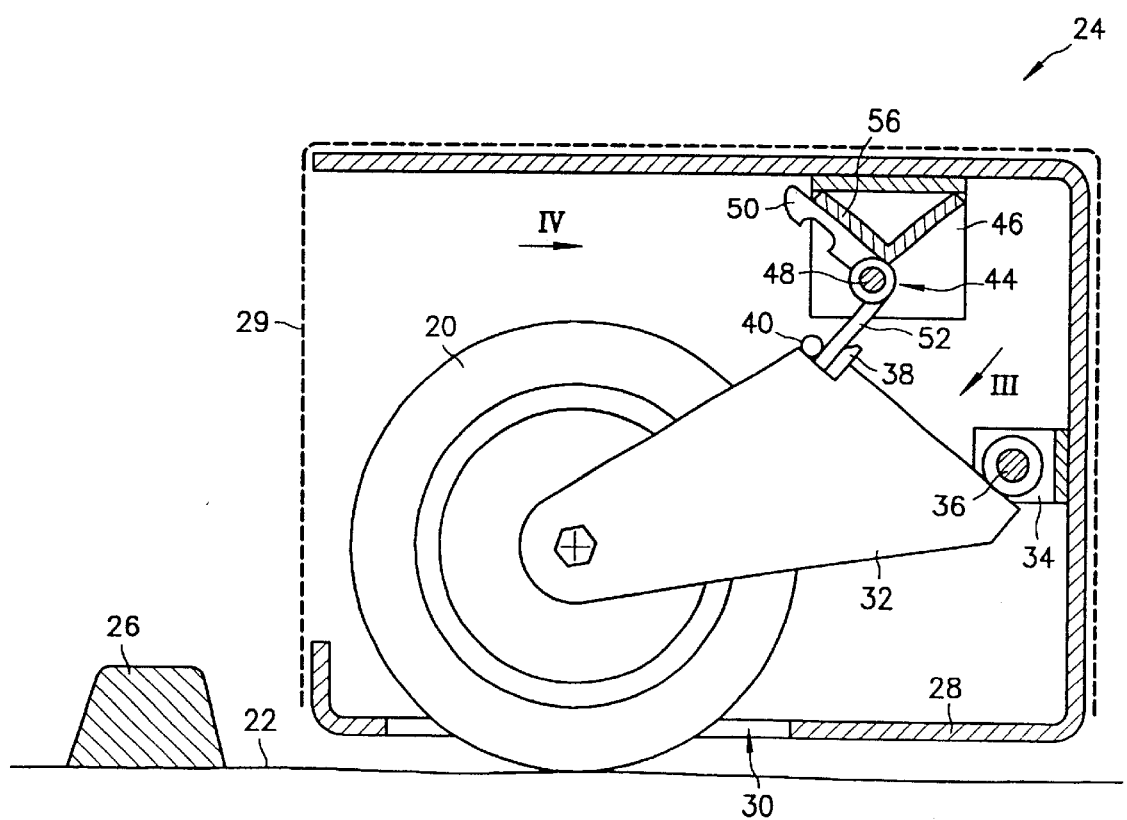
FIG. 2 is a detail of one of the rear wheel assemblies of the trolley, showing the parts thereof in their normal position just before the trolley reaches a barrier projecting from a surface on which the trolley is supported.
Figure 3:
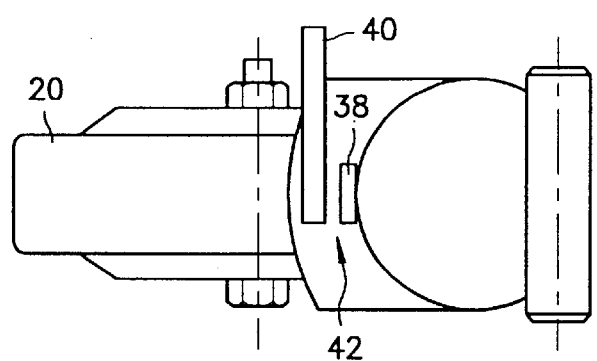
FIG. 3 is a view of the rear wheel and its wheel bracket, in the direction of arrow III in FIG. 2.
Figure 4:
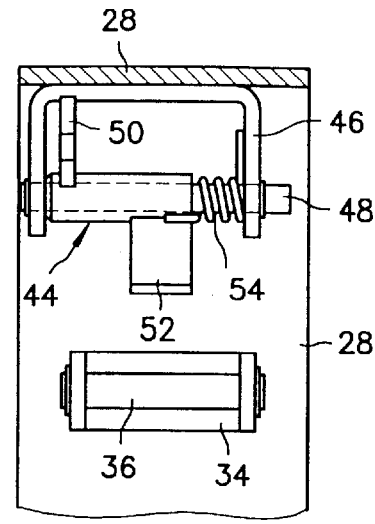
FIG. 4 is view of the inside of the assembly, in the direction of arrow IV in FIG. 2.

Referring now to FIGS. 2 to 6, the rear wheel assembly 24 comprises a support frame 28 on which various other parts of the assembly are mounted. At the bottom the frame 28 has an opening 30 therein, through which the wheel 20 protrudes when in the normal trolley-supporting position as illustrated in FIG. 2. The frame 28 with all the other parts of the assembly mounted thereon is located in a housing 29 (shown dotted in FIG. 2) which closes the open sides of the frame.

The wheel 20 is mounted for rotation on a wheel bracket 32. The wheel bracket 32 in turn is mounted pivotally on a bracket 34 which is fast with the frame 28, so that the wheel 20 is pivotally displaceable with respect to the frame on a pivot pin 36.

The wheel bracket 32 has a stop plate 38 and a catch 40 in the form of a rod fixed thereto, these two parts defining between them a gap 42.

Figure 5:
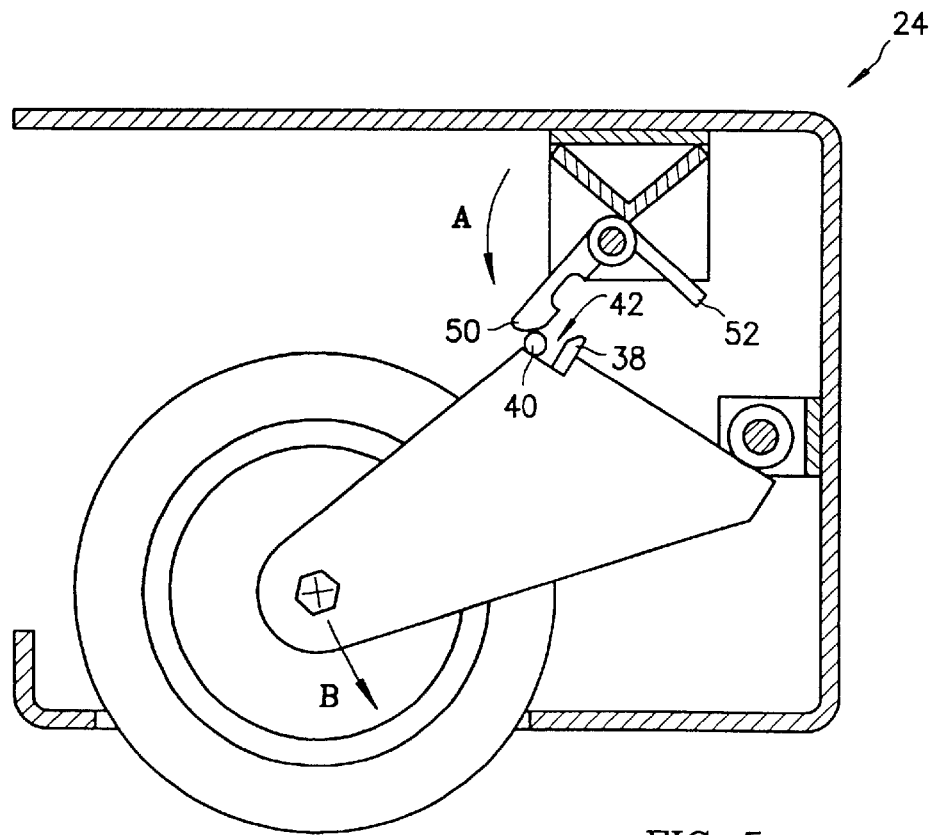
FIG. 5 is a view similar to FIG. 2, but showing the parts of the assembly in the position they are in while the trolley is being lifted to move it over the barrier.

Above the wheel bracket 32 there is a toggle element 44 which is pivotally mounted on a toggle-supporting bracket 46, the latter being fixed to the frame 28. The toggle element 44 is pivotally displaceable on a pivot pin 48. The toggle element 44 comprises a hooked, radially extending latch 50 which is able to engage with the catch 40, and a toggle 52 which is receivable in the gap 42. A coil spring 54 on the pin 48 biases the toggle element 44 in the direction of arrow A (FIG. 5). An angle section bracket 56 is further provided to form an end stop for the toggle element 44, so that the toggle element cannot pivot in the clockwise direction beyond the position indicated in FIG. 2.

Operation of the immobilising mechanism is as follows. Normally, the two rear wheels 20 of the trolley are in the position illustrated in FIG. 2, with the toggle element 44 being in a cocked position in which the coil spring 54 is tensioned and in which the toggle 52 is received in the gap 42. In this condition the toggle 52 holds the wheel 20 in the normal trolley-supporting position, i.e. the position in which it protrudes from the frame 28. The trolley normally bears down on each of the wheels 20.

When an attempt is made to remove the trolley beyond the area defined by the barrier 26, the housing 29 will bump against the barrier. The only way in which the trolley can be moved beyond the barrier 26 is to lift the rear end of the trolley over the barrier 26. If this is done, however, the trolley ceases to bear down on the rear wheels 20 and this causes the wheels 20, through their weight, to pivot about the pivot pin 36 in the direction of arrow B (FIG. 5). When this happens, the toggle 52 leaves the gap 42 and allows the toggle element 44 to pivot, under action of the coil spring 54, in the direction of arrow A to the position shown in FIG. 5, this being the un-cocked position of the toggle element.

If the trolley is thereafter lowered, the wheels 20 will collapse in that each of them will be pushed back into the respective housing via the opening 30. The toggle 52 is not now in the position in which it can support the wheel bracket 32 and the wheel 20 therefore moves entirely into the housing 29, causing the frame 28 itself to come to rest on the surface 22. Furthermore, the latch 50 engages with the catch 40 (FIG. 6), holding the wheel 20 in this condition. This will effectively immobilise the trolley, discouraging its removal from the shopping centre or airport premises.

There will be a key-hole (not shown) in the housing 29 through which a key can be inserted, the key being able to engage with the toggle element 44 to move it back to the cocked position. In this manner the trolley can be restored to an operative condition by an authorised person who has access to such a key.

To further discourage removal of the trolley beyond the barrier 26, the front wheels 18 may be offset in the front-to-rear direction of the trolley, as indicated in FIG. 7. Should an attempt be made to remove the trolley by lifting the rear end in order to push it along on the front wheels 18 only, the entire trolley will tilt to one side, making it very difficult to move the trolley in this manner. Alternatively, or in addition, the front wheels 18 may be cambered as illustrated in FIG. 8. This has been found to increase even further the difficulty with which the trolley can be moved forward by lifting the rear end thereof off the ground and pushing it along on the front wheels only.

To alert the user to the fact that the trolley should not be lifted, the handle 16 may be mounted on a pivot and have an end stop so that, when pushing forward or down on the handle, the end stop prevents movement of the handle about the pivot whereas, if the handle is pulled up, it will move about the pivot.

What is claimed is:

1. In a trolley having a support for supporting the trolley, the improvement wherein the support comprises:

a housing having an opening;

a support wheel; and an immobilizing mechanism which includes holding means for holding the support wheel in an operative position protruding from the opening supporting the trolley while the trolley bears down on the support wheel and automatically releasing the support wheel and displacing the support wheel to a collapsed position in the housing after the trolley has ceased to bear down on the support wheel, whereby the housing supports the trolley when the trolley again bears down on the support wheel, which displaces it into the collapsed position.

2. A trolley as claimed in claim 1, wherein the holding means comprises a displaceable member which is displaceable between a cocked position in which it operates to keep the support wheel in the operative position, and an un-cocked position in which it allows the support wheel to be displaced to the collapsed position.

3. A trolley as claimed in claim 2, wherein said displaceable member is spring-loaded by means of a spring, the spring biasing the displaceable member to the un-cocked position.

4. A trolley as claimed in claim 1, wherein the immobilizing mechanism further comprises a latch and a catch cooperating with the latch once the support wheel has moved to the collapsed position to keep the support wheel in the collapsed position.

5. A trolley as claimed in claim 1, and further comprising a wheel bracket that is pivotally displaceable with respect to the housing, the support wheel being mounted on the wheel bracket, and the holding means acting on the wheel bracket to hold the support wheel in the operative position.

6. A trolley as claimed in claim 1, wherein said support wheel is a rear wheel of the trolley, wherein the trolley has a laterally spaced pair of such rear wheels, wherein the trolley further has a laterally spaced pair of front support wheels, and wherein the front support wheels are offset with respect to one another in the front-to-rear direction of the trolley.

7. A trolley as claimed in claim 6, wherein the front support wheels are cambered.

8. A trolley as claimed in claim 1, wherein said support wheel is a rear wheel of the trolley, wherein the trolley has a laterally spaced pair of such rear wheels, wherein the trolley further has a laterally spaced pair of front support wheels, and wherein the front support wheels are cambered.

9. A trolley as claimed in claim 1, wherein the holding means is in the housing.

10. A trolley as claimed in claim 2, wherein the holding means is in the housing.

11. A trolley as claimed in claim 3, wherein the holding means is in the housing.

12. A trolley as claimed in claim 1, wherein the immobilizing mechanism is in the housing.

* * * * *